Figure 1:
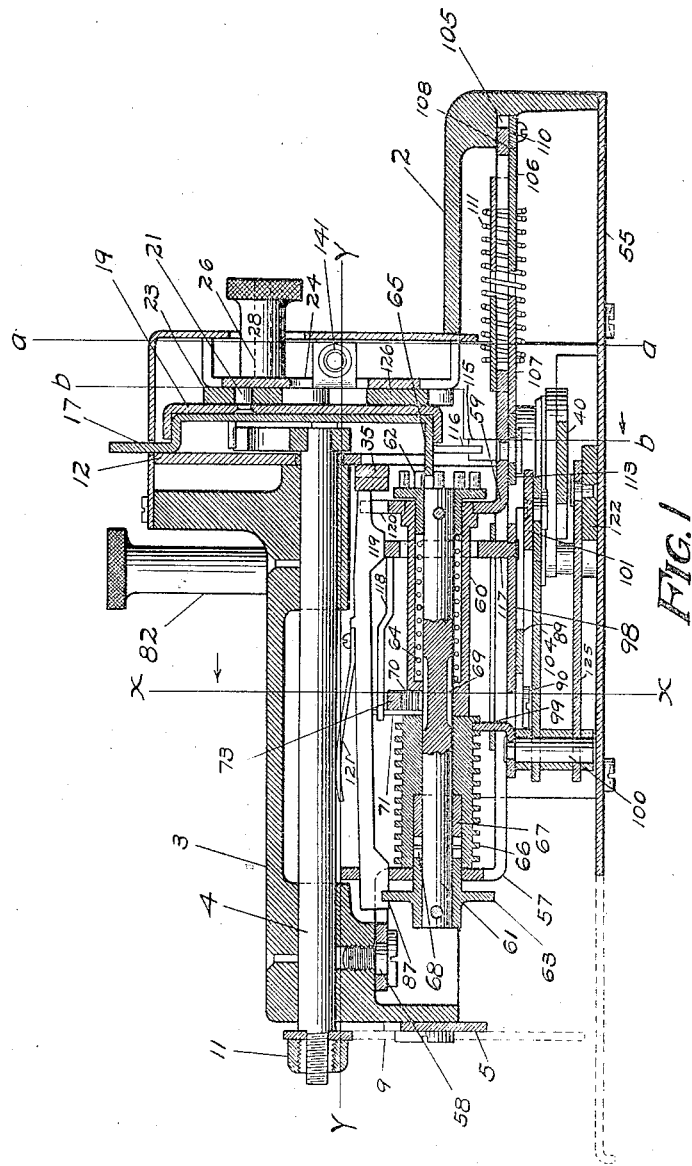

J. JESSEN.
BUTTONHOLE ATTACHMENT FOR SEWING MACHINES.
APPLICATION FILED FEB. 12, 1912.

1,125,334.

Patented Jan. 19, 1915.
15 SHEETS—SHEET 3.

WITNESSES
W. E. Naylor
H. Christopher

INVENTOR
JAMES JESSEN
BY Paul & Paul
ATTORNEYS

J. JESSEN.
BUTTONHOLE ATTACHMENT FOR SEWING MACHINES.
APPLICATION FILED FEB. 12, 1912.

1,125,334.

Patented Jan. 19, 1915.

15 SHEETS—SHEET 4.

WITNESSES.
W. E. Naylor
H. Christopher

INVENTOR
JAMES JESSEN.
BY Paul & Paul
ATTORNEYS

J. JESSEN.
BUTTONHOLE ATTACHMENT FOR SEWING MACHINES.
APPLICATION FILED FEB. 12, 1912.
1,125,334.
Patented Jan. 19, 1915.
15 SHEETS—SHEET 5.
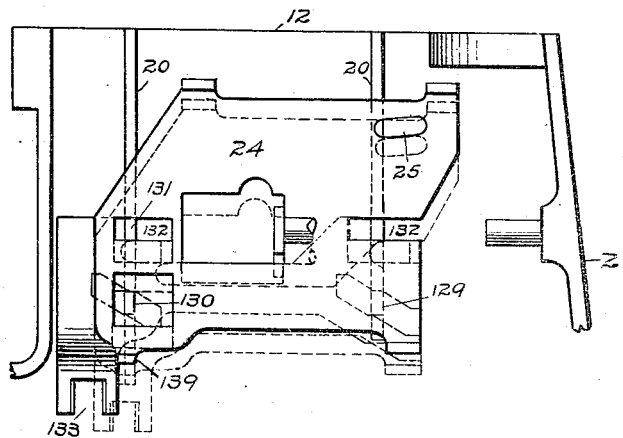
FIG. 6ª
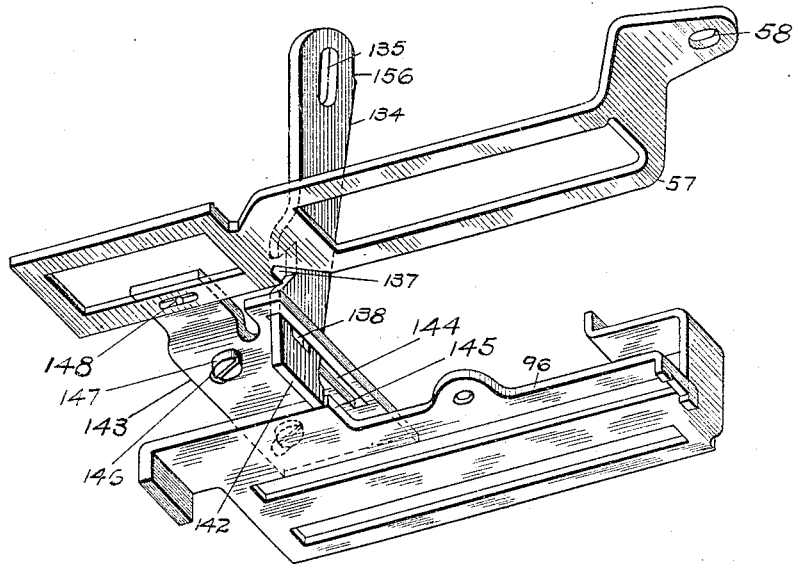
FIG. 7ª
WITNESSES
W E Naylor
H Christopher
INVENTOR
JAMES JESSEN
BY Paul & Paul
ATTORNEYS J. JESSEN.
BUTTONHOLE ATTACHMENT FOR SEWING MACHINES.
APPLICATION FILED FEB. 12, 1912.

1,125,334.

Patented Jan. 19, 1915.
15 SHEETS—SHEET 6.

WITNESSES
W. E. Naylor
H. Christopher

INVENTOR
JAMES JESSEN
BY Paul & Paul
ATTORNEYS

J. JESSEN.
BUTTONHOLE ATTACHMENT FOR SEWING MACHINES.
APPLICATION FILED FEB. 12, 1912.
1,125,334.
Patented Jan. 19, 1915.
15 SHEETS—SHEET 7.
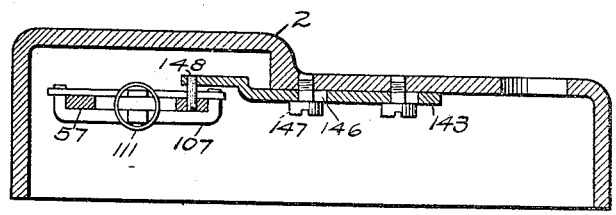
FIG. 7<sup>b</sup>
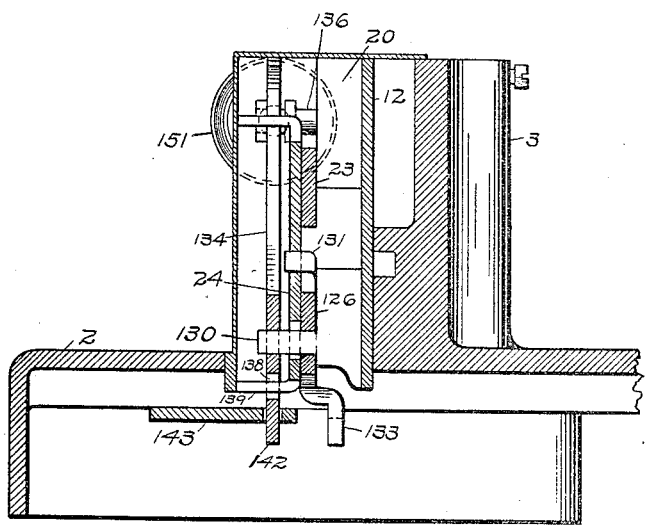
FIG. 7<sup>c</sup>
WITNESSES
W. E. Naylor
H. Christopher
INVENTOR
JAMES JESSEN
BY Paul & Paul
ATTORNEYS
THE NORRIS PETERS CO., PHOTO-LITHO., WASHINGTON, D. C.

J. JESSEN.
BUTTONHOLE ATTACHMENT FOR SEWING MACHINES.
APPLICATION FILED FEB. 12, 1912.
1,125,334.
Patented Jan. 19, 1915.
15 SHEETS—SHEET 9.
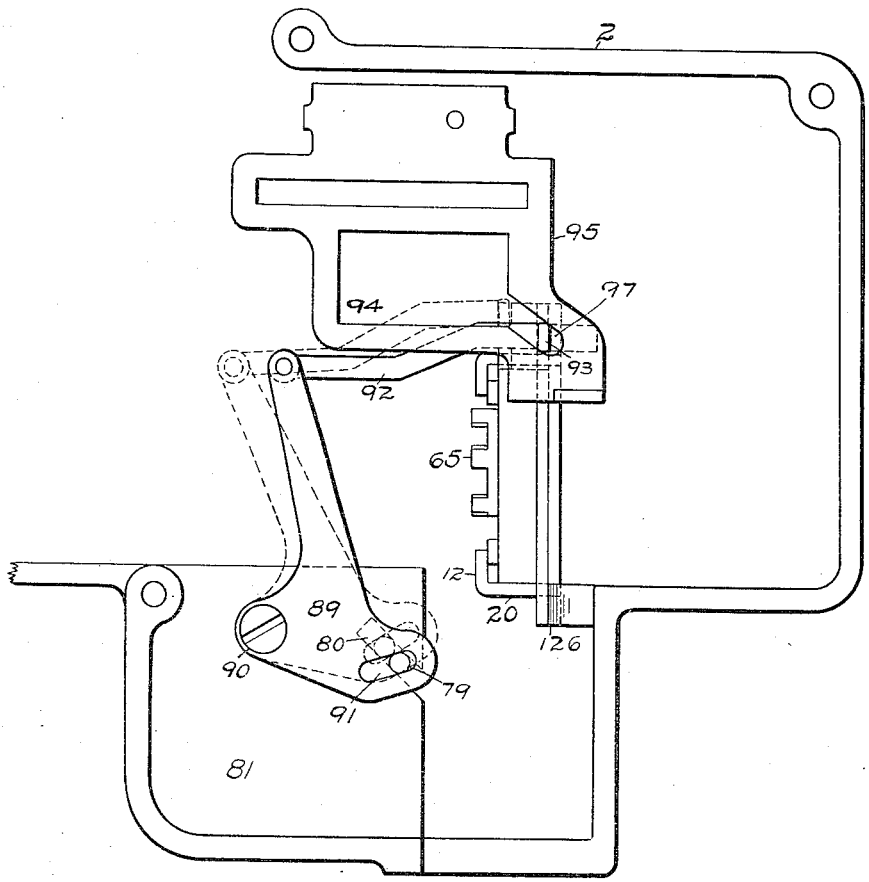
FIG. 15ᵃ
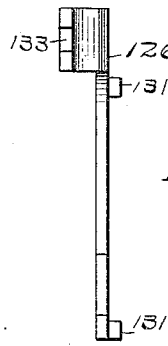
FIG. 8ᵃ
WITNESSES
W. E. Naylor.
H. Christopher,
INVENTOR
JAMES JESSEN.
BY Paul & Paul
ATTORNEYS J. JESSEN.
BUTTONHOLE ATTACHMENT FOR SEWING MACHINES.
APPLICATION FILED FEB. 12, 1912.
1,125,334. Patented Jan. 19, 1915.
15 SHEETS—SHEET 10.
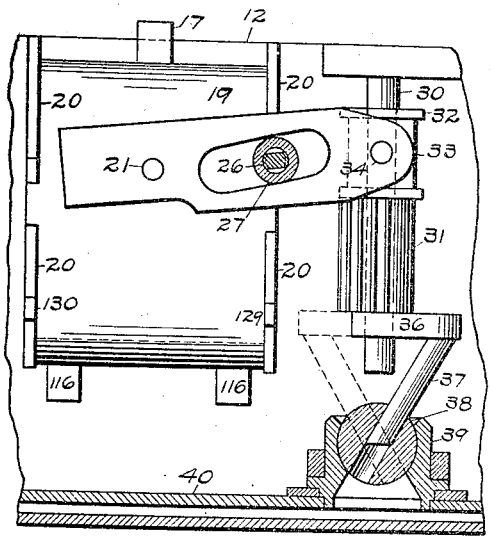
FIG. 9ᵃ
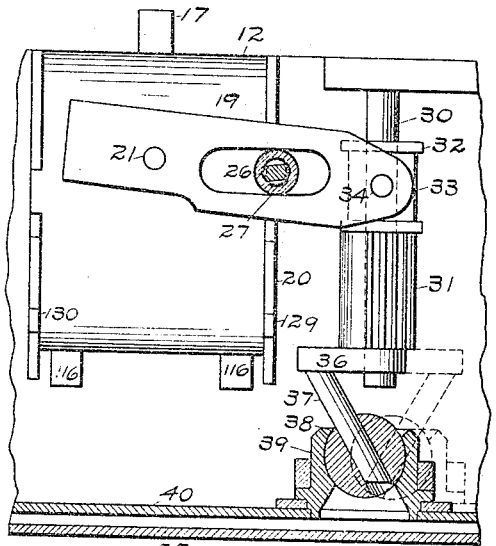
FIG. 9ᵇ
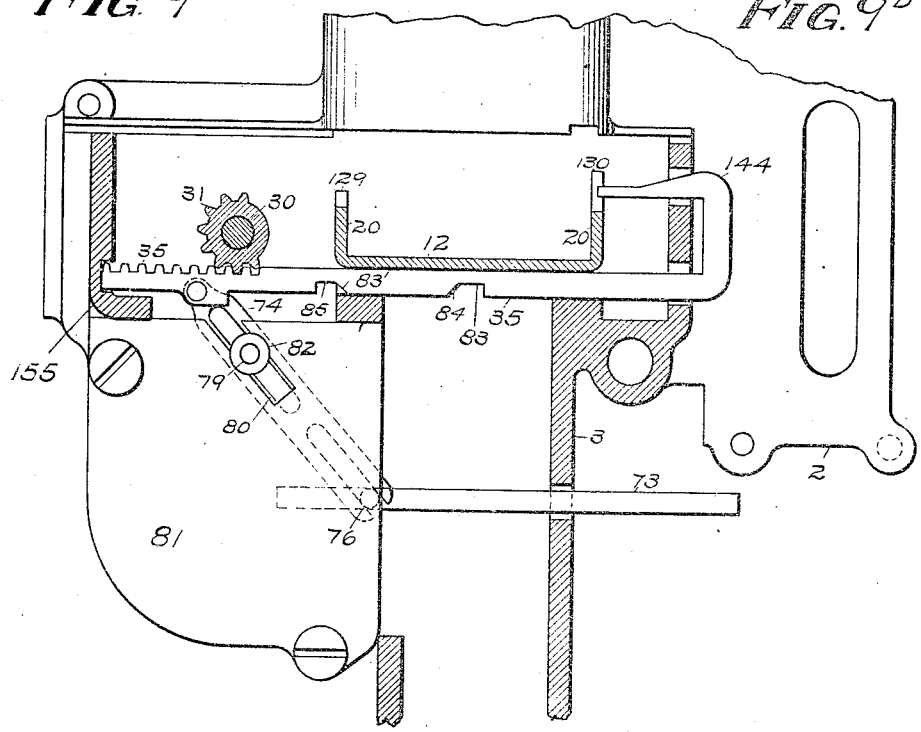
FIG. 12ᵃ
WITNESSES
W. E. Naylor
H. Christopher
INVENTOR
JAMES JESSEN
BY Paul & Paul
ATTORNEYS J. JESSEN.
BUTTONHOLE ATTACHMENT FOR SEWING MACHINES.
APPLICATION FILED FEB. 12, 1912.
1,125,334.
Patented Jan. 19, 1915.
15 SHEETS—SHEET 12.
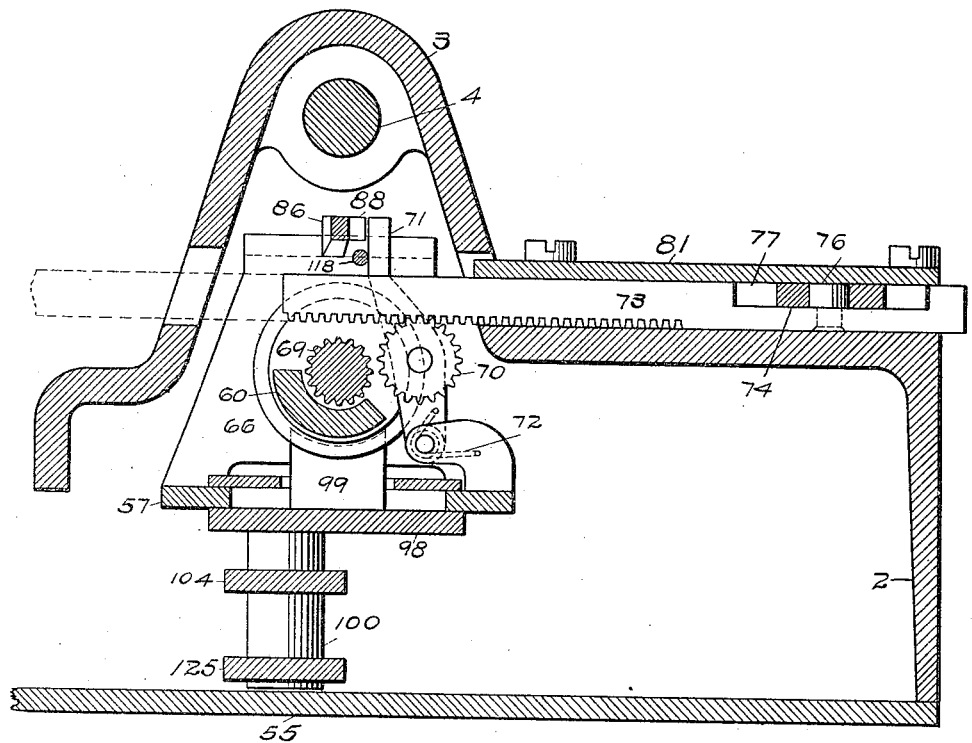
FIG. 12
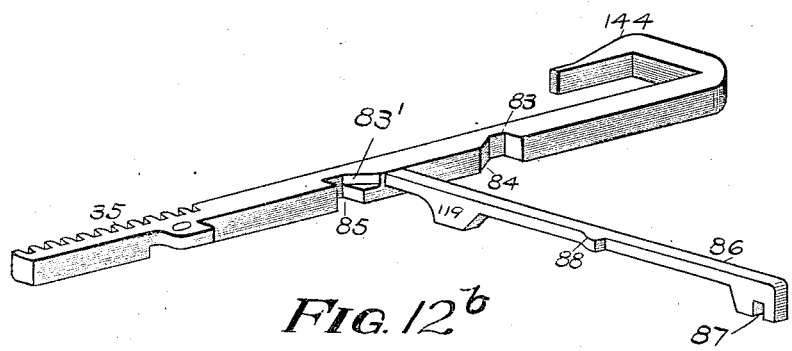
FIG. 12ᵇ
WITNESSES
W. E. Naylor
H. Christophers
INVENTOR
JAMES JESSEN
BY Paul & Paul
ATTORNEYS J. JESSEN.
BUTTONHOLE ATTACHMENT FOR SEWING MACHINES.
APPLICATION FILED FEB. 12, 1912.

1,125,334.

Patented Jan. 19, 1915.
15 SHEETS—SHEET 13.

WITNESSES
W. E. Naylor
H. Christopher

INVENTOR
JAMES JESSEN
BY Paul & Paul
ATTORNEYS

UNITED STATES PATENT OFFICE.

JAMES JESSEN, OF MINNEAPOLIS, MINNESOTA, ASSIGNOR TO JESSEN BUTTON-HOLE MACHINE COMPANY, OF MINNEAPOLIS, MINNESOTA, A CORPORATION.

BUTTONHOLE ATTACHMENT FOR SEWING-MACHINES.

1,125,334.  Specification of Letters Patent.  Patented Jan. 19, 1915.

Application filed February 12, 1912. Serial No. 676,980.

*To all whom it may concern:*

Be it known that I, JAMES JESSEN, a citizen of the United States, of Minneapolis, Hennepin county, Minnesota, have invented certain new and useful Improvements in Buttonhole Attachments for Sewing-Machines, of which the following is a specification.

The primary object of my invention is to provide an attachment to a sewing machine for stitching the eyelet at the end of a button-hole without turning the goods or the needle.

A further object is to provide an attachment which will stitch an ordinary straight button-hole or one having an eyelet of any suitable radius.

A further object is to provide an attachment capable of application to any style of sewing machine and needles of varying stroke.

Other objects of the invention will appear from the following detailed description.

The invention consists generally in means for stitching the button-hole eyelet with the stitches extending radially with respect to the eyelet.

Further the invention consists in means for stitching a button-hole eyelet of any suitable diameter and any desired number of stitches in the arc of the eyelet.

Further the invention consists in means for changing the bight of the stitches at the sides of the button-hole without changing the space between the inner ends of the opposite stitches.

Further the invention consists in various constructions and combinations, all as hereafter described and particularly pointed out in the claims.

Figure 2:
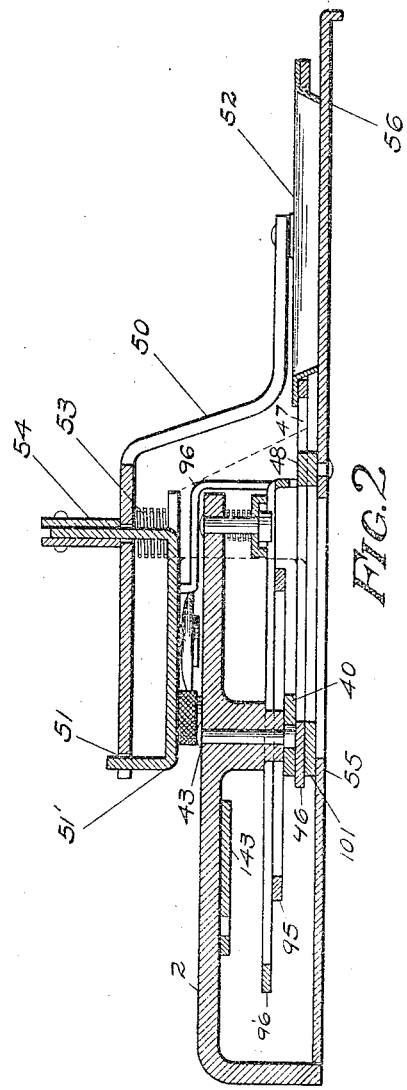
Figure 3:
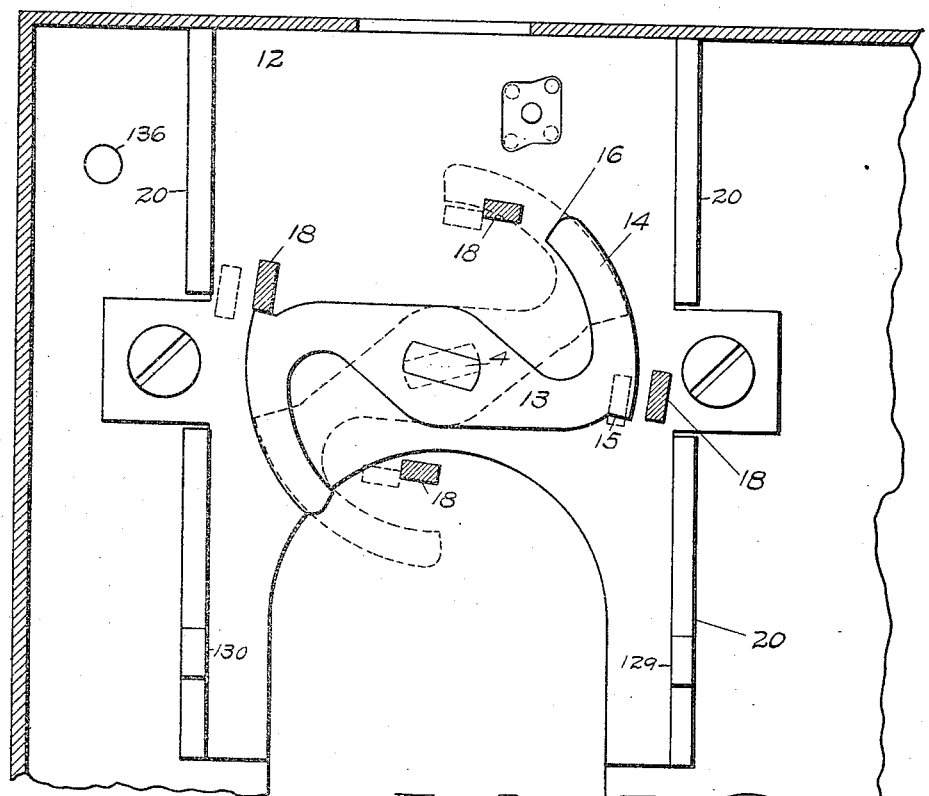
Figure 4:
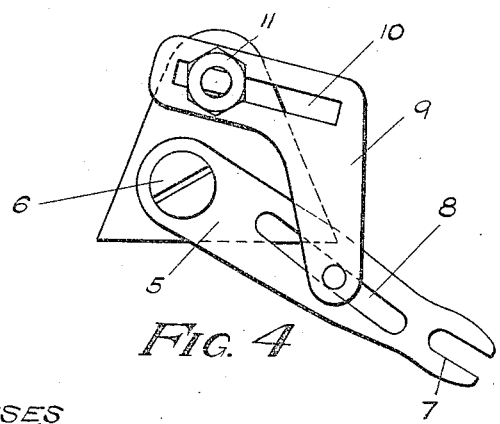
Figure 5:
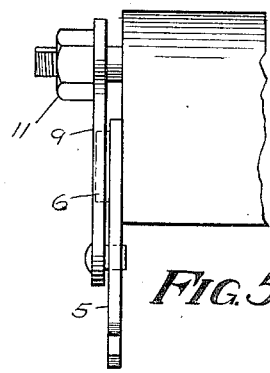
Figure 6:
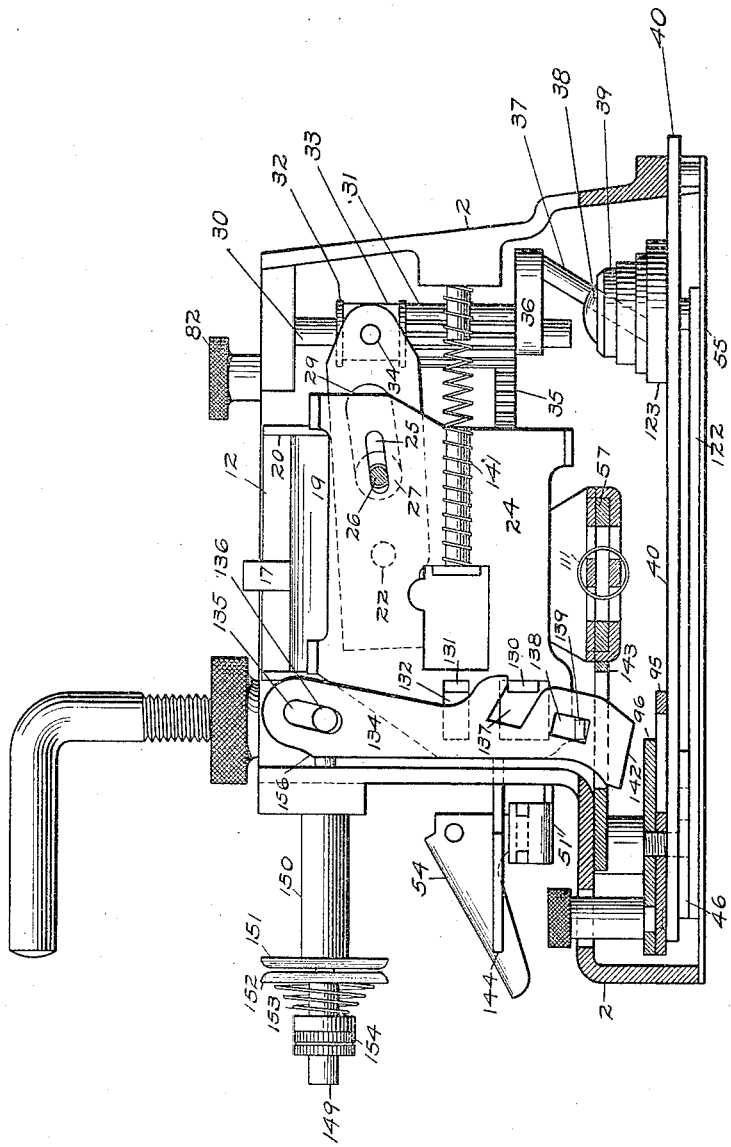
Figure 10:
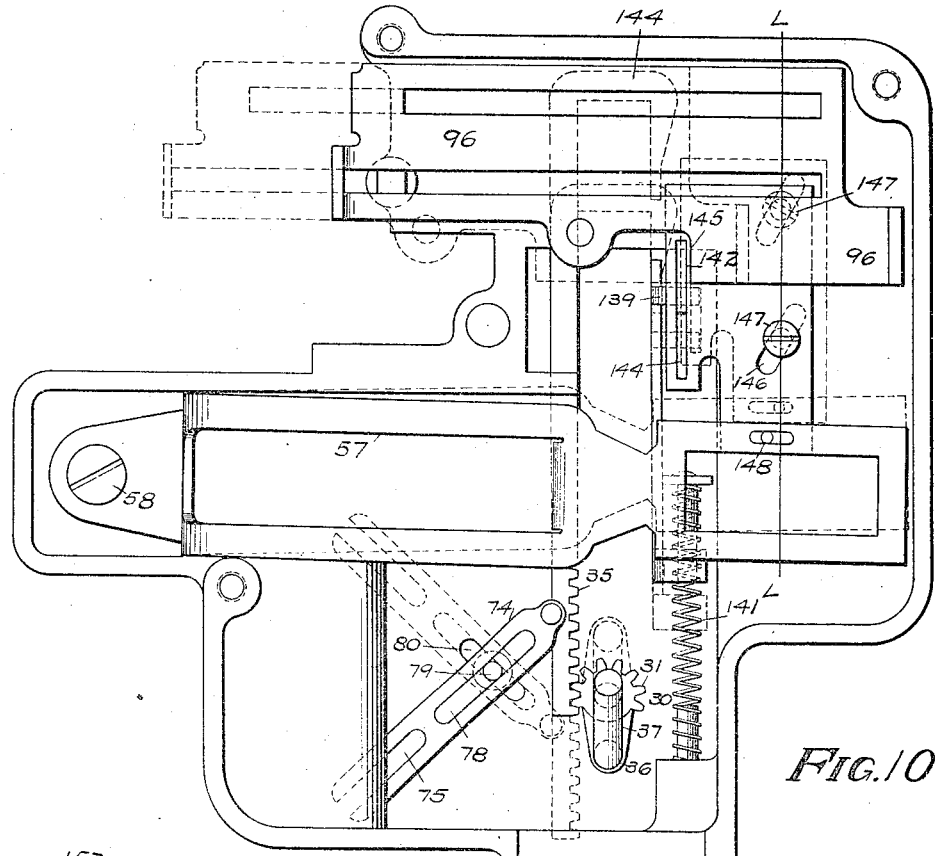
Figure 7:
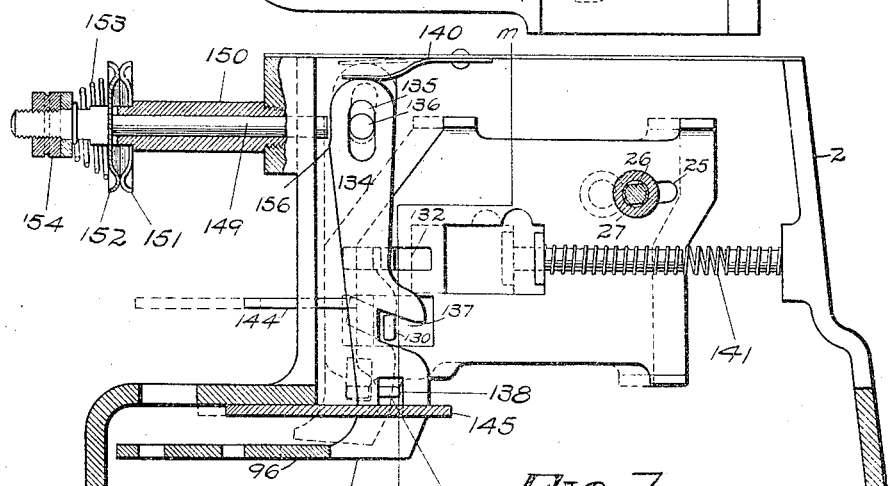
Figure 8:
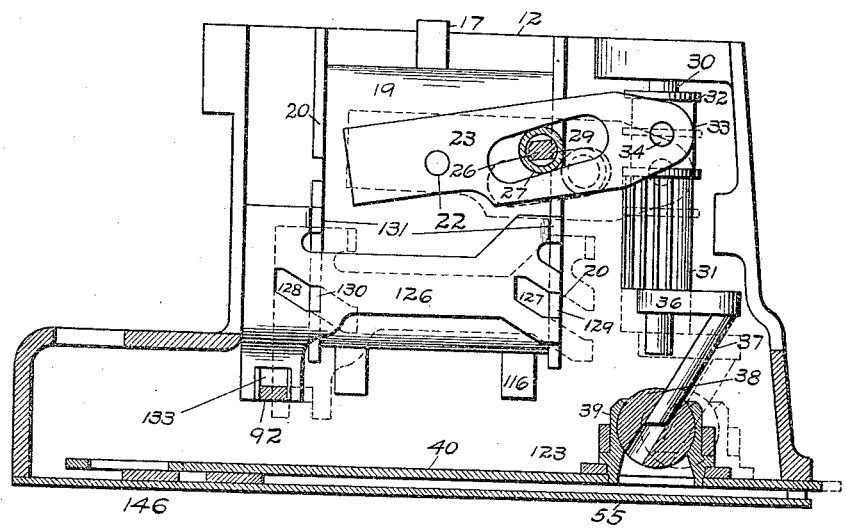
Figure 9:
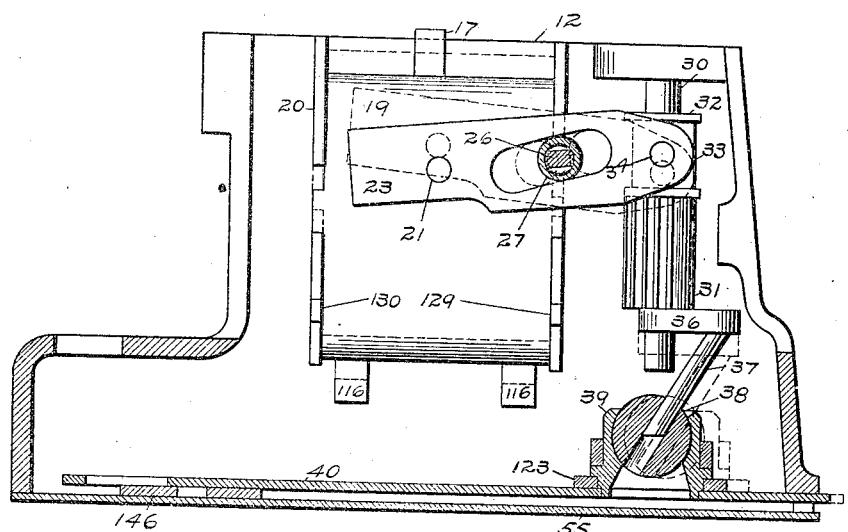
Figure 11:
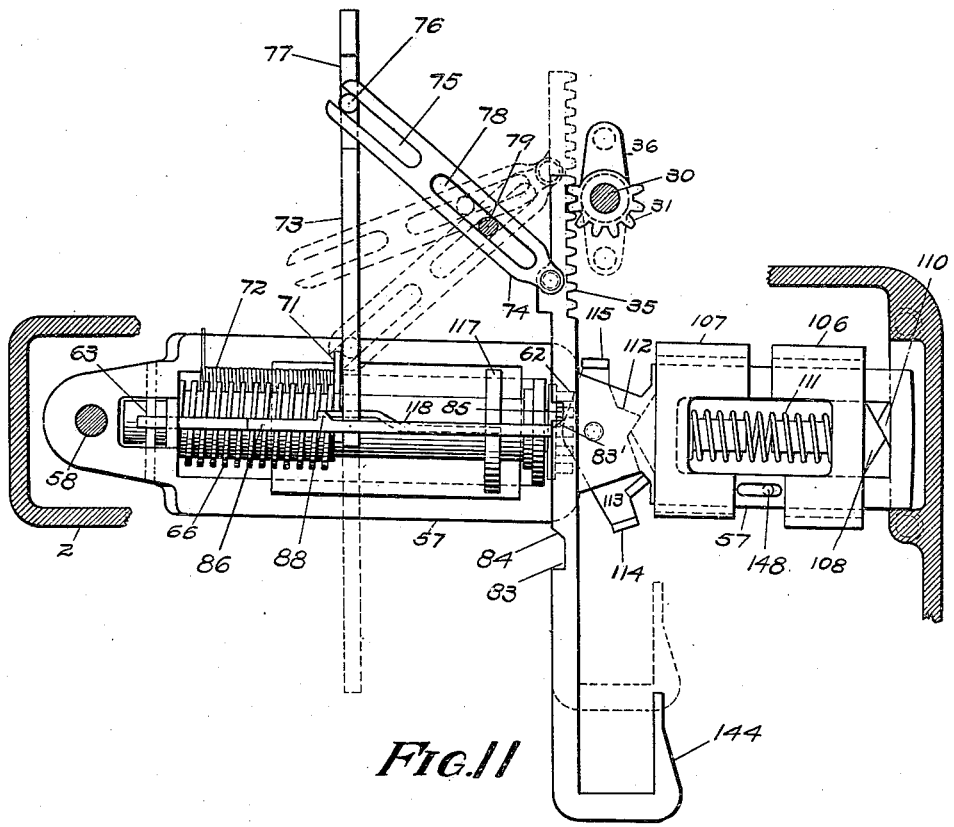
Figure 13:
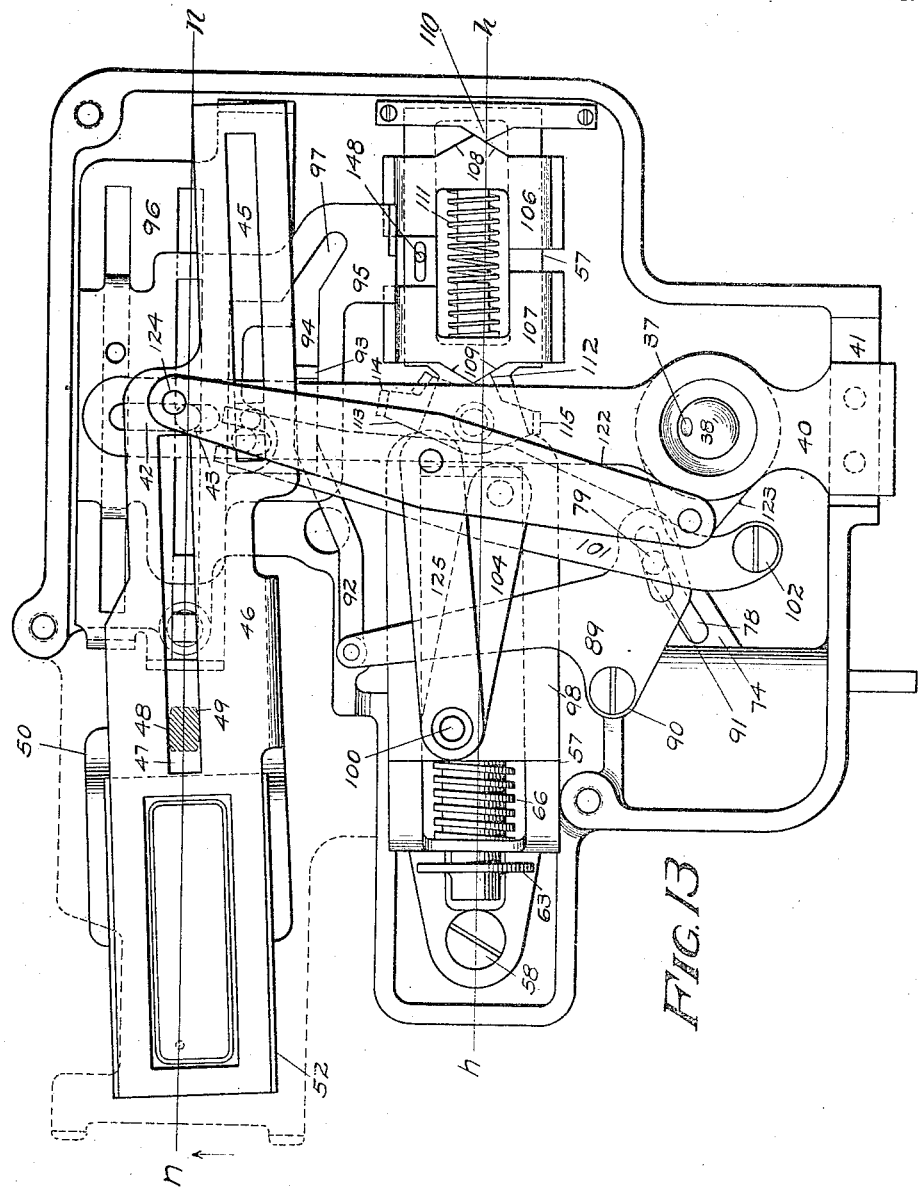
Figure 14:
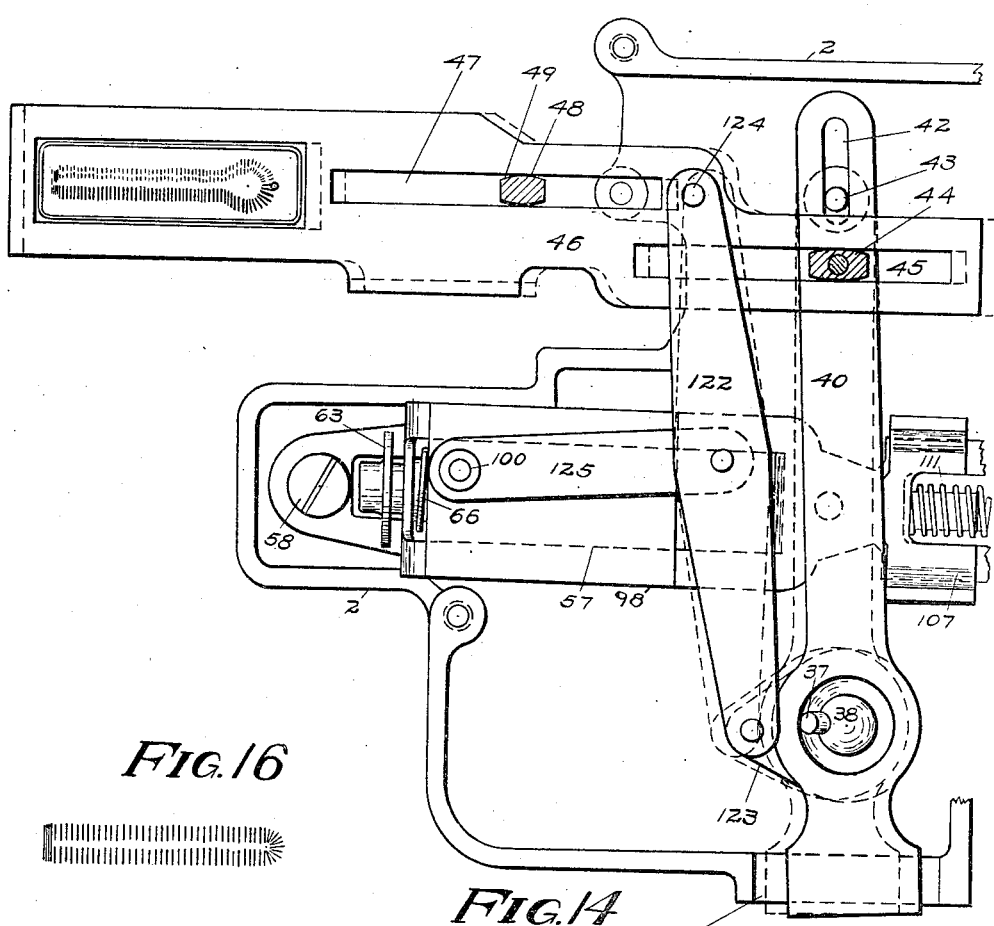
Figure 15:
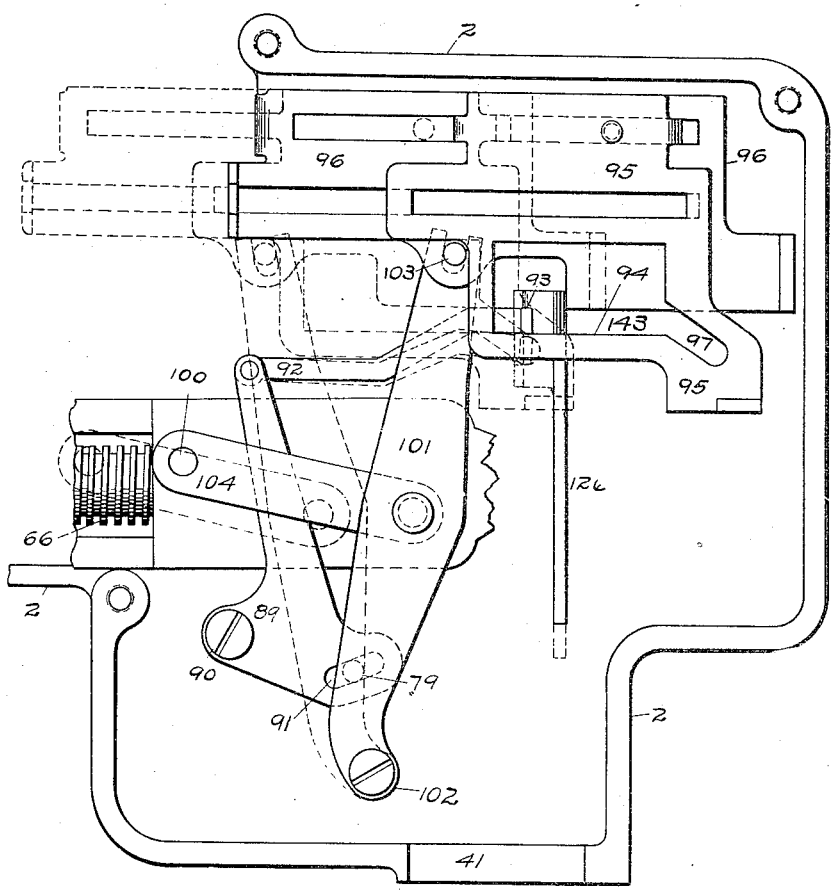

In the accompanying drawings forming part of this specification, Figure 1 is a vertical sectional view of a button-hole attachment for sewing machines embodying my invention, Fig. 2 is a similar view, taken on the section line $n$—$n$ of Fig. 13, Fig. 3 is a detail view of the rocker, showing its manner of engagement with the lugs on the plate through which the movement of the rocker is imparted to the mechanism of the attachment, Figs. 4 and 5 are detail views illustrating the means connecting the rocker shaft with the needle bar to allow the movement of the shaft to be accommodated to the stroke of the needle, Fig. 6 is a view, with the cover removed, on the section line $a$—$a$ of Fig. 1, Fig. 6$^a$ is a detail view illustrating the position assumed by the mechanism when the clamp plates are thrown out to form the straight line of stitches at the beginning of the eyelet, Fig. 7 is a sectional view on the line $b$—$b$ of Fig. 1, Fig. 7$^a$ is a detail perspective view, illustrating the relative positions of the feed plate and the oscillating plate in which the feed screw is mounted, and the position of the parts prior to the stitching of the bar at the end of the button-hole, Fig. 7$^b$ is a sectional view on the line $l$—$l$ of Fig. 10, Fig. 7$^c$ is a sectional view on the line $m$—$m$ of Fig. 7, Fig. 8 is a similar view, showing the mechanism for imparting a vibratory movement to the clamp plates, Fig. 8$^a$ is a detail view of one of the plates utilized in the movement of the clamp plates preparatory to stitching the row of stitches at the beginning of the eyelet, Fig. 9 is a similar view, showing a portion of the mechanism illustrated in Fig. 8 removed, Fig. 9$^a$ is a detail sectional view, showing the crank pin at the limit of its upward stroke, Fig. 9$^b$ is a similar view, showing the crank pin at the limit of its downward stroke, Fig. 10 is a bottom view of the attachment, Fig. 11 is a horizontal sectional view taken on the line $y$—$y$ of Fig. 1, Fig. 12 is a vertical sectional view on the line $x$—$x$ of Fig. 1, Fig. 12$^a$ is a detail sectional view showing the means for shifting the fulcrum of the lever between the rack bars, through the operation of which the mutilated pinion is rotated, Fig. 12$^b$ is a perspective view of one of the rack bars and the bar which controls the feed screw clutch, Fig. 13 is a bottom view of the machine with the base plate removed, showing the clamp vibrating plate and its connections, Fig. 14 is a similar view with some of the parts removed, Fig. 15 is a view corresponding to Figs. 13 and 14, with the clamp vibrating plate removed, showing a portion of the operating mechanism, Fig. 15$^a$ is a detail view showing the mechanism for controlling the formation of the eyelet at the end of the button-hole, Fig. 16 is a diagram of the button-hole stitches, showing the straight bar at one end of the button-hole and the eyelet stitches at the other end radiating from the center of the eyelet.

In the drawing, 2 represents the base or frame of the attachment, provided with a horizontal arm 3. This base and arm are made of metal, preferably cast in one piece. In the arm 3 a horizontal rock shaft 4 is journaled. A rocker arm 5 is pivoted at 6 on the end of the arm 3 and has a forked end 7 to engage the needle bar. It is also provided with a longitudinal slot 8. An angle plate 9 has a sliding pivotal connection at one end in the slot 8 and is provided at its other end with a slot 10 that is adapted to receive the flattened end of the rock shaft 4 and is held in place thereon by a lock nut 11. At the opposite end of the rock shaft 4 is a stationary plate 12, secured to the frame of the machine, through which plate the rock shaft extends and is provided with a rocker 13 having arms 14 provided with contact surfaces 15 and 16.

17 is a plate having a movement in a circumscribed path corresponding substantially in its function to the plate shown and described in Letters Patent of the United States No. 993,070, issued to me May 23, 1911. This plate is provided with inwardly projecting lugs 18 with which the contact surfaces 15 and 16 engage in the operation of the rocker.

In attaching the device to a sewing machine, the rocker is moved until one of the surfaces 15 is in engagement with a lug and the angle plate 9 is then adjusted on the rock shaft until the forked end of the arm 5 is in engagement with the needle bar at the upper end of the stroke of the needle. The movement of the rocker will then be so timed that it will accommodate itself to the stroke of the needle of the machine to which the attachment is applied, the arms 14 of the rocker slipping by their lugs after contacting therewith to compensate far variation in the stroke of the needle of one machine from that of the needle of another machine. I am thus able to easily and quickly adapt the attachment to sewing machines of varying stroke.

A plate 19 is carried by the plate 17 and has a vertical movement between the flanges 20 on the plate 12. A pivot pin 21 projects outwardly from the plate 19 and is adapted to enter a socket 22 provided in an arm 23. (See Figs. 8 and 9). A plate 24 has a slot 25 therein to receive a pin 26 that is provided on its inner end with an anti-friction roller 27, the outer end of said pin being threaded to receive an adjusting and tightening nut 28. (See Figs. 1, 6, 8 and 9). The arm 23 has a slot 29 therein to receive the anti-friction roller 27, said roller forming a fulcrum for the arm 23, and is adjustable back and forth in said arm to increase or decrease the distance between the fulcrum and the pin 22 and regulate the stroke or throw of the arm. (See Figs. 8 and 9). The slot 25 in the plate 24 allows the adjustment of the pin 26 or the fulcrum of the arm 23 to vary the stroke of the arm.

A stud 30 is mounted in the machine frame and depends vertically near one end of the arm 23 and carries a mutilated pinion 31 which is adapted to slide vertically on said stud and also rotate in a semi-circular path thereon. A spool 32 is provided at the upper end of the mutilated pinion and a block 33 is fitted to slide horizontally between the flanges of said spool and is pivotally connected at 34 with one end of the arm 23, said block sliding back and forth between the flanges of the spool and accommodating itself to the stroke of said arm. The mutilated pinion is adapted to mesh with the teeth of a horizontal rack bar 35, the teeth of the pinion being of sufficient length to allow vertical movement of the pinion without becoming disengaged from the teeth of the rack bar, so that lengthwise movement of the rack bar at any point in the vertical stroke of the pinion will rotate the pinion. (See Figs. 6, 8 and 9). At the lower end of the pinion is a rigidly mounted, laterally projecting arm 36 and fixed in the outer end of this arm is a depending pin 37. This pin is arranged at an angle to the axis of the stud 30, with its lower end intersecting the axis of said stud, if extended, and vertically slidable in a suitable bearing, such as a ball 38 carried by a socket 39. The ball moves freely in said socket to accommodate itself to the different positions of the arm 36 without cramping or binding the pin 37. (See Figs. 6, 8 and 9). The socket 39 is mounted on a transverse plate 40 and it is evident that when the pinion 31 is raised and lowered by the operation of the arm 23, that the vertical movement of the pin 37 will cause a longitudinal reciprocating movement of the plate 40, as indicated in Figs. 8 and 9. Obviously, the degree of reciprocation of the plate 40 will depend upon the length of stroke of the arm 23, and as this stroke can be easily varied by the adjustment of the fulcrum pin 26, I am able to regulate to a nicety the reciprocation of the plate 40. One end of the plate 40 projects through a slot 41 in the base of the attachment and its opposite end has a longitudinal slot 42 therein to receive a guiding pin 43 that is mounted in the base of the attachment. A lug 44 having curved bearing surfaces 44' is fastened on the plate 40 and fits within a longitudinal slot 45 in the lower clamp plate 46, (see Fig. 14), and said clamp plate has a longitudinal slot 47 to receive a lug 48 having curved bearing surfaces 49 which contact with the walls of the slot 47 and form a fulcrum on which the clamp plate 46 vibrates. (See Fig. 14).

An upper clamp plate 50 is pivoted at 51 on a bracket 51' that is carried by the lower clamp plate, and has a gripper device 52 which coöperates with the outer end of the lower clamp plate to grip the goods during the button-hole stitching operation. A spring 53 normally holds the upper clamp plate in its raised position and a cam lever 54 is provided for forcing said upper clamp plate downwardly against the tension of said spring. A bottom cover plate 55 has an extension 56 which forms a work plate beneath the lower clamp plate. (See Fig. 2.)

By means of the foregoing described mechanism, it is evident that the rocking of the shaft 4 will, through its connections, vibrate the clamp plates and the adjustment of the arm 23 on its fulcrum will determine the extent of the vibration and thereby regulate the bight of the button-hole stitches.

Referring to Fig. 1, 57 is a plate pivoted at 58 and provided with a backwardly turned tongue 59 in which a sleeve 60 is journaled. A shaft 61 is fitted within said sleeve and has a feed wheel 62 at one end of said hub secured to said shaft in the open end of the sleeve 60, and corresponding substantially to the feed wheel shown and described in my patent above referred to. At the opposite end of the shaft 60 is a disk 63, also secured on said shaft. A spring 64 is provided within the sleeve 60 inclosing the shaft 61 and normally tends to hold the feed wheel in the path of lugs 65 provided on the lower end of the plate 17, said lugs having the functions of the corresponding lugs of those which engage the feed wheel in my patent above referred to.

A screw 66 is loosely mounted on the shaft 61 and has a clutch 67 adapted to engage another clutch member 68 on the inner end of the hub of the disk 63, so that when the clutch members are in mesh with one another the revolution of the shaft will revolve the screw and the disk 63. The middle portion of the shaft 61 is provided with a series of teeth 69 adapted to mesh with the teeth of a pinion 70 carried by a pivoted plate 71 and normally held in engagement with the teeth on the shaft by a spring 72. (See Figs. 1 and 11.) A rack bar 73 is adapted to mesh with the pinion 70 and is disposed transversely with respect to the shaft 61 parallel, substantially, with the rack bar 35. (See Figs. 11 and 12.) A lever 74 is pivoted at one end on the rack bar 35 and has a longitudinal slot 75 in its opposite end that is adapted to receive a pin 76 provided within a recess 77 in the edge of the bar 73. The link 74 also has a longitudinal slot 78 that is adapted to receive a vertical pin 79, which has a threaded upper end adjustable in a slot 80 provided in a plate 81 and locked in said slot by means of a locking sleeve 82. The pin 79 forms the fulcrum of the lever 74 and the adjustment of the pin back and forth in the slot 78 regulates the length of the stroke of the rack bar 73 and the lever 74, and the speed of the rack bar 35. The rack bar 35 is provided with a notch 83, having a beveled end wall 84 and said rack bar also has a notch 85 with one square end wall and its opposite wall provided with a beveled upper portion 83'. A bar 86 is arranged lengthwise of the shaft 61 and above the same and has a notch 87 at one end to receive the disk 63, the opposite end of the bar 86 bearing on the edge of the rack bar 35 and sliding thereon in the lengthwise movement of the rack bar. The bar 86 is provided on one side with a cam lug 88 having a beveled surface that is adapted to engage the pivoted plate 71 and push it outwardly on its pivot a sufficient distance to disengage the teeth of the pinion 70 from the teeth 69 of the shaft, thereby arresting further lengthwise movement of the rack bar 73. This disengagement of the pinion from the operating teeth of the shaft takes place when the bar 35, having moved a measured distance, allows the end of the bar 86 to drop into one of the notches 83 or 85, said bar 86 being held with a yielding pressure against the edge of the bar 35 by the tension of the spring 64, as will be clearly understood upon reference to Figs. 1 and 11. When the bar 86 is riding on the edge of the bar 35, as shown in Fig. 11, and the pinion is driven by the teeth of the shaft 61, it is evident that movement of the bar 73 will, through its lever connection, move the bar 35 lengthwise in the opposite direction.

The movement of the bar 73 is uniform, being positively driven from the revolving shaft, but the speed of the bar 35 depends upon the position of the pin 79 in the slot 78. If the pin is near the pivot of the lever 74 the movement of the bar 35 will be slower and if the pin 79 is moved toward the middle portion of the slot 78 the bar 35 will travel faster during the stroke of the bar 73. The movement of the bar 35 will rotate the pinion 31 and swing the arm 36 to describe an arc and cause the clamp plate and the goods held thereby to describe a similar arc. The distance between the stitches in the curved portion of the eyelet is controlled by the movement of the bar 35 and the pinion. If these parts move slowly it is evident that the stitches will be nearer together than if they move rapidly, and as the distance between the stitches should be substantially the same for any radius of the eyelet, I provide a mechanism controlled by the movement of the pin 79 which, at the time the said pin is adjusted to regulate the speed of the bar 35, will also adjust the mechanism for regulating the radius of the eyelet. This radius regulating mechanism, referring to Figs. 13 and 15, consists of a plate 89 pivoted at 90 on the base of the machine and having a slot 91 that is adapted to receive the lower end of the pin 79. The slot 80 in the plate 81 and the slot 78 in the bar 74 must necessarily be parallel with one another at the position shown in dotted lines in Fig. 11 to allow change of position of the fulcrum pin 79 without moving its connections, but in order that adjustment of the plate 89 may be obtained, it is evident that the slot 91 must be at an angle with respect to the slot 80 so that when the pin 79 is moved back and forth in the slot 78 to change the speed of the rack bar 35, the plate 89 will be swung on its pivot to change the position of the arm 92, which is pivotally connected to one end of the plate 89 and has an end 93 which projects into a slot 94 provided in a shifter plate 95 carried by the feed plate 96. A slot 97 forms an angular continuation of the slot 94 in the plate 95 and the position of the arm 92 with respect to this slot 97 determines the radius of the eyelet. If the arm 92 is set so that the screw reversing mechanism will be tripped before the arm enters the slot 97, no eyelet will be formed at the end of the buttonhole, while if the bar is set to enter the slot 97 the clamp plates will swing outwardly and form a series of stitches in a straight line at an angle to the side stitches of the button-hole. The distance the bar enters the slot 97 will regulate the distance the row of stitches are formed at an angle to the side stitches of the button-hole and the length of the arc of the eyelet. When the lug 93 enters the slot 97 the arm 92 will be oscillated to move the plate 126 to the position indicated by dotted lines in Fig. 8, and shift the plate 23 and the oblique pin 37 and throw the clamp plate to form the stitches at an angle to the row of stitches at the side of the button-hole. The rack bar 35 and the pinion have a uniform stroke, while the speed of the rack bar is regulated by the adjustment of the arm 92. This speed will be commensurate with the radius of the eyelet and the number of stitches to a given movement of the goods. If the speed of the rack bar is increased, the pinion will be rotated at a corresponding increase and the stitches will be formed farther apart in the goods. On the other hand, if the speed of the rack bar is decreased, the stitches will be nearer together. I am able, therefore, by increasing or decreasing the speed of the rack bar pinion to adapt the machine for stitching eyelets of different sizes without changing the spaces between the stitches. In other words, the arc of the eyelet may be increased or decreased and still maintain a uniform spacing of the stitches. The position of the stitches at the end of the buttonhole with respect to the side stitches will be governed by the angle of the slot 97 with respect to the slot 94, and by varying this angle between the slots I may provide for a different arrangement of the stitches and for eyelets of different shape. The linear angle of the stitches at the end of the buttonhole will correspond, as shown in Fig. 14, to the angle of the slot 97, as shown in Fig. 13.

As shown in the drawing, the stitches of the eyelet, instead of being formed on a curved continuation of the side row of stitches, are radially arranged with respect to the center of the eyelet. This is due to the fact that the oblique pin swings on the arc of a circle while the eyelet stitches are being formed.

A plate 98 is mounted to slide on the plate 57 and has a lug 99 which engages the feed screw 66, the revolution of the screw operating to move the lug 99 back and forth thereon in the movement of the machine. (See Fig. 1). A pin 100 is carried by the plate 98 and a plate 101 is pivoted at 102 on the frame of the machine and has a pivotal connection at its opposite end with the feed plate 96 while a link 104 connects the plate 101 with the pin 100 so that the movement of the plate 98 back and forth on the screw operates to reciprocate the feed plate and the clamp plates and feed the goods during the stitching operation. (See Fig. 15).

As heretofore stated, the plate 57 has one end pivoted at 58 and its opposite end is adapted to move laterally in a guide-way 105 provided in the base of the machine. (See Fig. 11). Slides 106 and 107 are mounted on the plate 57 and have beveled surfaces 108 and 109, the frame being normally held in yielding engagement with a corresponding stationary surface 110 by means of a spring 111 which is preferably interposed between the slides. (See Fig. 13.). The beveled surface 109 is engaged by a tooth 112 on a trip lever 113 that is pivoted on the plate 57 and has lugs 114 and 115 which are alternately engaged by depending lugs 116 on the plate 17. (See Figs. 8, 9, and 13.) This alternate engagement of the lugs shifts the beveled surface 108 from one side of the surface 110 to the other and changes the position of the plate 57 and the feed wheel to drive the screw in the other direction, all as shown and described with reference to my patent above referred to. The movement of the trip lever 113 to set it in position to be engaged by the lugs 116 is accomplished by contact of the shifter plate 95 with said lever when the plate is moving in one direction and by the engagement of the arm 101 with said lever when the feed plate is moving in the other direction, the same operation being performed by a different mechanism in my former patent.

It will be noted from an examination of

Fig. 13 that the trip lever has been struck by the arm 101 and shifted, the pressure of the slide 107 on the tooth of the trip lever operating to swing the end of the trip lever struck by the arm 101 out of engagement with said arm as soon as the tooth 112 has moved past the apex of the beveled surface 109. The plate 98 carries a standard 117 which encircles the sleeve 60 and is movable back and forth with the plate 98. (See Fig. 1). An arm 118 is carried by the standard 117 and extends parallel with the feed screw in position to engage the pivoted plate 71 and force it backwardly against the tension of its spring and disengage the pinion 70 from the teeth 69. (See Fig. 1). This disengagement of the pinion from its operating teeth takes place during the stitching of the straight bar at one end of the button-hole and at that time the rack bar 73 will be stationary and the clamp plates will be vibrated in the ordinary way to form a straight row of stitches. Prior to the completion of the travel of the standard 117 toward the right in Fig. 1, it will contact with a beveled surface on a shoulder 119 provided on the lower edge of the bar 86 and lift this bar from the lower portion of the square notch 85 in the bar 35 into the upper part that is provided with the beveled end surface 83', the plate 57 to be shifted from the position shown in Fig. 13 to the position shown in Fig. 11, preparatory to the stitching of the beveled end of the button-hole. The end of the bar 86 moves vertically in a slot 120 provided in the tongue 59 and is yieldingly held in a depressed position by a spring 121. (See Fig. 1).

Referring to Figs. 13 and 14, 122 is an arm pivotally connected at one end to a strap 123 that is loosely mounted around the socket 39 on the plate 40. The opposite end of the arm 122 is pivotally connected at 124 with the lower clamp plate. A link 125 pivotally connects the middle portion of the arm 122 with the pin 100. During the vibration of the clamp plates in stitching the sides of the button-hole, the arm 122 has no function other than feeding the clamp plate longitudinally of the button-hole, the vibrating movement being performed entirely by the reciprocation of the plate 40. As soon, however, as the pinion 31 begins its rotation to swing the plate 40 in the arc of a circle for the stitching of the curved portion of the eyelet, the plate 122 will operate to impart to the clamp plate the circular movement of the plate 40. When the pinion 31 has completed its semi-rotation and the curved portion of the eyelet has been stitched, the plate 40 will again resume its functions of a merely vibratory movement for the stitching of the other side of the button-hole.

Referring to Fig. 8, 126 is a plate arranged beneath the arm 23 and provided with inclined slots 127 and 128 to receive stationary lugs 129 and 130 on the flanges 20. The plate 126 is also provided with lugs 131 that are adapted to enter slots 132 provided in the plate 24. (See Figs. 6 and 7). One end of the plate 126 has a notch 133 therein to receive the arm 92. This arm, as will appear from the foregoing description, is normally stationary after being once adjusted, unless its adjustment causes it to enter the slot 97, in which case the arm will be oscillated to move the plate 126 endwise for the purpose hereinafter specified. A depending arm 134 is provided at its upper end with a longitudinal slot 135 adapted to receive a stationary pin 136 mounted in the frame of the machine. This slot is inclined to allow vertical and edgewise movement of the arm. The lower portion of the arm 134 has an inclined slot 137 therein to receive the outer end of the lug 130, said lug operating to lift the arm 134 during its edgewise movement. The lower portion of the arm 134 has an opening 138 therein to receive a lug 139 on the lower edge of the plate 24, said lug operating to move the arm 134 edgewise simultaneously with its upward movement through its engagement with the lug 130. A spring 140 bears on the top of the plate 134 and holds it down with a yielding pressure. A compression spring 141 is mounted on the plate 24 and the frame of the machine and tends to force said plate 24 and its connections toward the left, as indicated in Figs. 6 and 7. The lower end of the arm 134 has a foot piece 142 that is adapted to bear on the edge of the feed plate 96, the feed plate sliding thereon during the operation of stitching the sides of the button-hole.

A plate 143 is provided, having a narrow slot 144 to receive the lower end of the arm 134. This slot is of sufficient length to allow the arm 134 to drop off the shoulder 145 provided on the feed plate, preparatory to stitching a straight bar at the end of the button-hole. The plate 143 has slots 146 therein to receive screws 147 on which said plate is slidable, being actuated through a slot and pin connection with the plate 57. After the arm 134 drops off the shoulder 145 it will be lifted a sufficient distance to clear the feed plate and when the plate 57 is shifted at the end of the button-hole the plate 143 will be moved edgewise to carry the arm 134 to a point above the shoulder of the feed plate, so that said arm will be in position to drop down again behind the feed plate in the position indicated by full lines in Fig. 7ª, when the bar 35 is pushed back into the machine preparatory to stitching another button-hole. A pin 149 is slidable lengthwise through a stud 150 and has its inner end in the path of the arm 134 on the outer end of the stud. Tension disks 151 and 152 are provided, held together with a yielding pressure by means of a spring 153. The tension of this spring is regulated by means of the nuts 154. When the arm 134 engages the end of the pin 149 by means of the cam portion 156 preparatory to stitching the bar at the end of the button-hole, the disks are separated, relieving the tension or cutting out entirely this auxiliary tension, which, during the side stitching, I prefer to utilize as an adjunct to the tension of the sewing machine.

In beginning the button-hole, the bar 35 is pushed into the recess 155, (see Fig. 12ª), when the end of the bar 86 will drop into the notch 83, throw the feed screw clutch to its operative position and disengage the pinion 70 from the shaft teeth. Thereupon the operation of the mechanism will vibrate the clamp plates and move the feed plate to advance the goods. When the end of the side stitches on one side of the button-hole has been reached, if the arm 92 has been set to enter the slot 97 the plate 126 will be moved lengthwise and through the inclined slots therein will be a downward movement. At the same time the plate 24 will be forced down by means of the lugs 131 and the slots 132 to the position indicated by dotted lines in Fig. 6ª, thereby lowering the fulcrum of the arm 23 and forcing the pinion 31 down to the position indicated in Fig. 9ᵇ. This downward movement of the pinion forces the crank pin down into its socket and moves the plate 40 endwise to throw the clamp plates out at an angle to the side stitches and stitch the beginning of the eyelet.

At the point where the curve in the eyelet begins, the shifter mechanism will throw the plate 57 to shift the position of the feed wheel and this movement of the plate 57 will move the bar 86 out of the slot 83 over the beveled or inclined end wall 84. As soon as this has been done, the movement of the feed screw will cease temporarily, the clutch being thrown out by the lengthwise movement of the bar 86, and simultaneously with the stopping of the feed screw the pinion 70 will be allowed to move into engagement with the teeth 69, and the bar 73 will then begin its stroke and the movement of the bar 35 will revolve the pinion 31 a half revolution and cause the clamp plates to describe the curve or arc of the eyelet. During this stitching of the curved portion of the eyelet, the bar 35 will travel outwardly toward the full line position indicated in Fig. 11 and as the notch 85 approaches the end of the bar 86 the stitching of the curved portion of the eyelet will be completed, and when the bar 86 drops into the notch 85, the feed screw will again be set in motion and the return movement of the plate 40 will draw the clamp plates in to stitch the straight stitches on the other side of the eyelet. When the bar 86 drops into the notch 85 the pinion 70 will be disengaged from the shaft teeth and the movement of the bar 73 will cease. When the plate 40 has returned to its normal position the stitching of the other side of the button-hole will be begun and continued until the opposite end of the button-hole is reached. At this time the arm 134 will drop off the edge of the feed plate and the plate 24 will be projected by the tension of its spring 141 toward the left to raise the arm 134 and relieve the secondary tension by the engagement of said arm with the pin 149. This movement of the plate 24 will change the position of the fulcrum on the arm 23 and increase the stroke of the crank pin 37 and the vibration of the clamp plates.

The slot 25 in the plate 24 is diagonally arranged, as indicated plainly in Figs. 8 and 9, and this slot has the effect of shifting the crank and crank pin when the plane of the crank is changed preparatory to stitching the bar at the end of the button-hole. It will be understood in stitching the sides of the button-hole that the centers of the stitches will be at one side of the opening, while in stitching the bar at the end of the button-hole this center must be changed in order to have the ends of the stitches uniform with respect to the side stitches. This I accomplish by providing this diagonal slot in the arm 23 so that in shifting the pinion and crank the crank pin will be moved also to change the centers of the stitches, so that the ends of the bar will be uniform with the side stitches of the button-hole. Upon the completion of the bar stitches the shifting of the plate 57 through the operation of the shifter mechanism heretofore described will throw the bar 86 out of the notch 85, the end of the bar having been raised by the standard 117 into the upper part of the notch 85, so that it may slip out of the notch over the beveled surface 83′ and will then be in the position indicated by full lines in Fig. 11, the pinion 70 being held out of engagement with the teeth of the shaft by the arm 118 and the bar 35 being at the limit of its outward movement ready to be pushed back to begin another button-hole. The plate 24 as it moves toward the left, propelled by its spring 141, stops in the path of the hooked end 144 and when this hooked end is pushed back into the machine it will engage the edge of the plate 24 and push it back also, against the tension of its spring, until the arm 134 drops down below the edge of the feed plate, as indicated by full lines in Fig. 7, when the parts will be in position to start the side stitches of another button-hole.

I claim as my invention:

1. The combination, with a clamp plate and means for feeding the same, of a crank arm, a crank pin carried by said arm and inclined with respect to the axis of said arm, a bearing connected with said clamp plate and wherein said crank pin is slidable, and means for moving said pin lengthwise in said bearing to vibrate said clamp plate during the feeding operation.

2. The combination, with a feed plate and a clamp plate, of a crank arm, a crank pin carried by said arm and inclined with respect to the axis of said arm, a bearing connected with said clamp plate and wherein said crank pin is slidable, means for moving said pin lengthwise in its bearing to vibrate said clamp plate, and means for operating said feed plate.

3. The combination, with a feed plate and a clamp plate, of a crank arm, a crank pin inclined inwardly to intersect the axis of said arm if extended, a bearing connected with said clamp plate and wherein said crank pin is slidable, and means for actuating said crank pin and said feed plate.

4. The combination, with a feed plate and a clamp plate, of a crank arm, a crank pin mounted thereon, said pin being inclined inwardly toward the axis of said arm, a bearing connected with said clamp plate and wherein said crank pin is slidable, means for operating said crank pin and said feed plate, and means for increasing or decreasing the stroke of said crank pin.

5. The combination, with a clamp plate and means for feeding the same, of a crank arm, a crank pin carried by said arm and inclined with respect to the axis of said arm, a bearing connected with said clamp plate and wherein said crank pin is slidable, means for shifting said crank arm to move said crank pin lengthwise in its bearing to vibrate said clamp plate, and means for rotating said arm to swing said clamp plate.

6. The combination, with a feed plate and clamp plate, of a crank arm, a crank pin carried by said arm and inclined with respect to the axis of said arm, a bearing connected with said clamp plate and wherein said crank pin is slidable, means for moving said pin lengthwise in its bearing to vibrate said clamp plate, means for rotating said crank arm to cause said clamp plate to describe the arc of a circle, means for operating said feed plate, and means for rendering said feed plate temporarily inoperative during the rotation of said crank arm.

7. The combination, with a clamp plate and a feed plate, of a reciprocating plate connected with said clamp plate, a bearing mounted on said reciprocating plate, a crank arm having a crank pin inclined inwardly toward the axis of said arm and slidable in said bearing, means for operating said feed plate, means for rotating said crank arm to cause said clamp plate to describe a curved path, and means for rendering said feed plate operating means temporarily inoperative during the rotary movement of said crank arm.

8. The combination, with a feed plate and a clamp plate, of a pinion and crank pin having a sliding and a rotary movement, means operatively connecting said crank pin with said clamp plate, means for reciprocating said pinion to vibrate said clamp plate, and means for rotating said pinion to cause said crank pin and clamp plate to describe the arc of a circle, means for operating said feed plate, and means for rendering said feed plate temporarily inoperative during the rotation of said pinion.

9. The combination, with a feed plate and a clamp plate, of a rotating crank arm, a crank pin and bearing therefor operatively connected with said clamp plate, said pin being inclined inwardly toward the axis of said crank arm and slidable in its bearing, means for increasing or decreasing the stroke of said crank pin to increase or decrease the vibration of said clamp plate, means for rotating said crank arm to cause said clamp plate to describe the arc of a circle, means for actuating said feed plate, and means for rendering said actuating means temporarily inoperative during the rotary movement of said crank arm.

10. The combination, with a feed plate and a clamp plate, of a crank arm and pinion thereon, a stud whereon said pinion and arm are slidable, a crank pin carried by said arm and inclined inwardly toward the axis of said arm, a bearing connected with said clamp plate and wherein said crank pin is slidable, means for shifting said crank pin in its bearing to increase or decrease the throw of said clamp plate, means for rotating said pinion to cause said crank arm and clamp plate to describe the arc of a circle, means for operating said feed plate, and means for rendering said feed plate temporarily inoperative during the rotation of said pinion.

11. The combination, with a feed plate and clamp plate, of a crank arm and pinion having a reciprocating and a rotary movement, means for reciprocating said pinion, means operatively connecting said crank arm with said clamp plate to vibrate the same when said pinion is reciprocated, a rack bar engaging said pinion, means for intermittently operating said rack bar to rotate said pinion a uniform distance but at a variable speed, means for operating said feed plate, and means for rendering said feed plate temporarily inoperative during the rotation of said pinion.

12. The combination, with a feed plate and a clamp plate, of a crank arm and pinion having a reciprocating and a rotary movement, means operatively connecting said crank arm with said clamp plate to vibrate said plate, means for reciprocating said pinion and crank arm, a rack bar arranged to engage said pinion and rotate it with the longitudinal movement of said bar, means for operating said bar intermittently, whereby said pinion will be rotated and said clamp plate will be caused to describe the arc of a circle, means for operating said feed plate, and means for rendering said feed plate temporarily inoperative during the rotation of said pinion.

13. The combination, with a feed plate and a clamp plate, of a crank arm, a crank pin carried by said arm and inclined with respect to the axis of said arm, a bearing connected with said clamp plate and wherein said crank pin is slidable, means for moving said pin lengthwise in its bearing to vibrate said clamp plate, means for rotating said crank arm at a predetermined point a uniform distance but at a variable speed to cause said clamp plate to describe the arc of a circle, means for operating said feed plate, and means for rendering said feed plate temporarily inoperative during the rotation of said crank arm.

14. The combination, with a feed plate and a clamp plate, of a crank arm, means operatively connecting said crank arm with said clamp plate, means for reciprocating said crank arm to vibrate said clamp plate, means for directing said clamp plate outwardly to form stitches in a row at an angle to the row of side stiches, means for rotating said crank arm to cause said clamp plate to describe an arc of a circle, means for varying the speed of rotation of said crank arm to compensate for the difference in the length of the arc described, means for operating said feed plate, and means for rendering said feed plate temporarily inoperative during the rotation of said crank arm.

15. The combination, with a feed plate and a clamp plate, of a crank arm, means operatively connecting said crank arm with said clamp plate, said arm having a reciprocating movement to vibrate said clamp and a rotary movement, means for reciprocating said arm, a rack bar geared to said arm and having a uniform longitudinal movement, means for varying the speed of movement of said rack bar, means for operating said rack bar to rotate said crank arm and cause said clamp to describe the arc of a circle, means for operating said feed plate and means for rendering said feed plate temporarily inoperative during the rotation of said crank arm.

16. The combination, with a clamp plate and a feed plate, of a crank arm, means operatively connecting said crank arm with said clamp plate to vibrate the same, means for reciprocating said crank arm, said arm having a rotary movement, a rack bar geared to said arm, a feed wheel having a driving connection with said crank arm operating means, a second rack bar a shaft connected with said wheel and having a driving connection with said second bar, means operatively connecting said first named rack bar with said second named bar for moving said first named bar at predetermined intervals and rotating said crank arm, and means for disconnecting said second named bar from said shaft to render said first named rack bar temporarily inoperative.

17. The combination, with a clamp plate and means including a pin arranged obliquely to its path of reciprocation for vibrating said plate crosswise with respect to the button-hole and means for feeding said plate lengthwise to stitch the sides of the button-hole, of means for directing said plate outwardly in a straight line at an angle to the row of side stitches to form the initial stitches of the eyelet, means for temporarily checking the feed of said plate and means for swinging it on the arc of a circle and vibrating it in a direction radially with respect to the center of the arc to stitch the curve of the eyelet.

18. The combination, with a clamp plate and a feed plate having a longitudinal slot therein and a diagonal extension thereof, of means for vibrating said clamp plate and moving said feed plate horizontally, an arm movable in said slot and extension of said feed plate, the entrance of said arm into said extension causing said clamp plate to be thrown outwardly to move in a direction at an angle to its initial movement, and means for adjusting said arm to regulate the angular travel of said clamp plate.

19. The combination, with a clamp plate and a feed plate, of a longitudinal slot therein, and a diagonal extension of said slot, means for vibrating said clamp plate and means for moving said feed plate, an arm movable in the slot and extension of said feed plate, the entrance of said arm into said extension allowing said clamp plate to move outwardly in a direction at an angle to its initial movement, means for adjusting said arm in said slot and extension, means for temporarily rendering said feed plate inoperative and means for causing said clamp plate to describe the arc of a circle during the inaction of said feed plate.

20. The combination, with a clamp plate, of means for vibrating the same, a feeding means operatively connected with said clamp plate, an arm having a pivotal connection with said clamp plate and with said vibrating means, a link pivotally connecting said arm intermediate to its ends with said feeding means, and means for oscillating said arm and link on the pivotal connection of said arm with said feeding means to swing said clamp plate to stitch the curve of the eyelet.

21. The combination, with a clamp plate and means for vibrating the same, of a feed screw, means engaging said feed screw and having operative connections with said clamp plate, a strap loosely connected with said vibrating means, an arm pivotally connected with said clamp plate and with said strap and free to move lengthwise during the vibrating operation, a link pivotally connecting said arm intermediate to its ends with said screw engaging means, and means for swinging said link and arm on the pivotal connection of said link with said screw engaging means to swing said clamp plate and stitch the curve of the eyelet.

22. The combination, with a clamp plate, and means for feeding it lengthwise, of a crank arm, a crank pin carried by said arm and inclined with respect to the axis of said arm, a bearing connected with said clamp plate and wherein said crank pin is slidable, means for moving said pin lengthwise in its bearing to vibrate said clamp plate and means for shifting said pin in its bearing to move said clamp plate and to center the bar stitches with respect to the side stitches of the button-hole.

23. The combination, with a feed plate and a clamp plate, of a crank arm, a crank pin carried by said arm and inclined with respect to the axis of said arm, a bearing connected with said clamp plate and wherein said crank pin is slidable, means for moving said pin lengthwise in its bearing to vibrate said clamp plate, means for shifting said pin in its bearing to move said clamp plate and center the bar stitches with respect to the side stitches of the button-hole, and means for operating said feed plate.

24. The combination, with a feed plate and a clamp plate, of a crank arm, a crank pin carried by said arm and inclined with respect to the axis of said arm, a bearing connected with said clamp plate and wherein said crank pin is slidable, an arm operatively connected with said crank pin and having a diagonal slot and a fulcrum fitting therein and adjustable lengthwise of said slot, means for rocking said arm to move said pin lengthwise in its bearing and vibrate said clamp plate, and means for shifting said fulcrum on the inclined edge of said slot to change the position of said pin in said bearing, and center the bar stitches at the end of the button-hole with respect to the side stitches.

25. The combination, with a feed plate and a clamp plate and means for operating the same, said feed plate having a recess in its edge, of an arm adapted to bear and slide on the edge of said feed plate and drop into said recess when said feed plate reaches a predetermined point, and means released by the entrance of said arm into said recess for increasing temporarily the length of vibration of said clamp plate.

26. The combination, with a clamp plate and a reciprocating member, of a pin arranged obliquely to its path of reciprocation and carried by said member and connected with the said clamp plate, and means for simultaneously reciprocating and rotating the said member.

27. The combination, with a clamp plate and a reciprocating member, of a pin arranged obliquely to its path of reciprocation and carried by said member, a bearing connected with said clamp plate and engaging said pin, means for rotating said reciprocating member, and means for shifting the position of said reciprocating member with respect to said bearing.

28. The combination, with a clamp plate and a reciprocating member, of a pin arranged obliquely to its path of reciprocation, a bearing connected with said clamp plate and engaging said pin, means for rotating said reciprocating member, means for shifting the position of said member with respect to said bearing, and means for regulating the relative speed of rotation and reciprocation.

29. The combination, with a clamp plate and a reciprocating member, of a pin arranged obliquely to its path of reciprocation, a bearing connected with said clamp plate and engaging said pin, means for rotating said reciprocating member, means for shifting the position of said member with respect to said bearing, means for adjusting the relative speed of rotation and reciprocation, and means for simultaneously shifting the position of said member.

30. The combination, with a clamp plate, of a crank pin arranged obliquely to its path of reciprocation, a bearing connected with said clamp plate and wherein said crank pin is slidable, means for moving said pin lengthwise in its bearing to vibrate said clamp plate, means for shifting said pin in its bearing to move said clamp plate and center the bar stitches with respect to the side stitches of the button-hole at one end of the button-hole, and means for simultaneously reciprocating and rotating said pin at the other end of the button-hole.

31. The combination, with a clamp plate, of a reciprocating plate connected therewith, a pin arranged obliquely to its path of reciprocation and having a bearing in said reciprocating plate and slidable therein, means for reciprocating said pin, and means for regulating the length of stroke of said pin.

32. The combination, with a clamp plate and a bearing connected therewith, of a pin arranged obliquely to the path of reciprocation and slidably mounted in said bearing, means for reciprocating said pin, and means for swinging said pin around the vertical axis of said bearing to oscillate said clamp plate.

33. The combination, with a clamp plate, of a pin arranged obliquely to its path of reciprocation and a bearing connected with said clamp plate and wherein said pin is slidable, means for moving said pin lengthwise in its bearing to vibrate said clamp plate, and means for shifting said pin in its bearing to move said clamp plate and center the bar stitches with respect to the side stitches of the button-hole.

34. The combination, with a clamp plate and a reciprocating member, of a pin obliquely arranged with respect to the longitudinal axis of said member and carried thereby, a bearing connected with said clamp plate and wherein said pin is movable, means for vibrating said member and said pin and means for rotating the said member.

35. The combination, with a clamp plate and means for feeding the same, of a crank pin, a bearing connected with said clamp plate and wherein said crank pin is slidable, said pin being obliquely mounted with respect to its path of reciprocation, and means for moving said pin lengthwise in said bearing to vibrate said clamp plate during the feeding operation.

36. The combination, with a clamp plate and means for feeding the same, of a crank pin, a bearing connected with said clamp plate and wherein said crank pin is slidable, means for moving said pin lengthwise in said bearing to vibrate said clamp plate during the feeding operation, means for swinging said pin to oscillate said clamp plate, and means for temporarily checking the feeding of said clamp plate during its oscillating movement.

37. The combination, with a clamp plate and means including a pin arranged obliquely to its path of reciprocation for vibrating said plate, and means for feeding it lengthwise to stitch the sides of a button-hole, of means for temporarily checking the longitudinal feed of said plate, and means for swinging said plate on the arc of a circle and vibrating it in a direction radially with respect to the center of the arc to stitch the curve of the eyelet.

38. The combination, with a clamp plate and a reciprocating member connected with said plate and obliquely mounted with respect to its path of reciprocation, of means for simultaneously reciprocating and rotating said member.

39. The combination, with a clamp plate and a bearing connected therewith, of a reciprocating member obliquely mounted with respect to its path of reciprocation, and means for swinging said reciprocating member around the vertical axis of said bearing to oscillate said clamp plate.

40. The combination, with a clamp plate and means for vibrating said plate and means for feeding it lengthwise to stitch the sides of a button-hole, of means for temporarily checking the feed of said plate and means for swinging it on the arc of a circle to stitch the curve of an eyelet, said swinging means including a pin having rotary movement on its support, said pin being arranged obliquely to its axis of rotation.

In testimony whereof, I have hereunto set my hand this 1st day of February, 1912.

JAMES JESSEN.

Witnesses:
GENEVIEVE E. SORENSEN,
EDWARD A. PAUL.

Copies of this patent may be obtained for five cents each, by addressing the "Commissioner of Patents, Washington, D. C."